(12) United States Patent
Bregman et al.

(10) Patent No.: US 8,332,947 B1
(45) Date of Patent: Dec. 11, 2012

(54) SECURITY THREAT REPORTING IN LIGHT OF LOCAL SECURITY TOOLS

(75) Inventors: Mark Bregman, Los Gatos, CA (US); William E. Sobel, Stevenson Ranch, CA (US)

(73) Assignee: Symantec Corporation, Mountain View, CA (US)

( * ) Notice: Subject to any disclaimer, the term of this patent is extended or adjusted under 35 U.S.C. 154(b) by 1448 days.

(21) Appl. No.: 11/426,917

(22) Filed: Jun. 27, 2006

(51) Int. Cl.
*G06F 11/00* (2006.01)
*G06F 12/14* (2006.01)
*G06F 12/16* (2006.01)
*G08B 23/00* (2006.01)

(52) U.S. Cl. ........................................................ 726/25
(58) Field of Classification Search .................... 713/188
See application file for complete search history.

(56) References Cited

U.S. PATENT DOCUMENTS

| | | | |
|---|---|---|---|
| 5,392,207 A | 2/1995 | Wilson et al. | |
| 5,675,710 A | 10/1997 | Lewis | |
| 5,757,916 A | 5/1998 | MacDoran et al. | |
| 5,778,304 A | 7/1998 | Grube et al. | |
| 5,826,249 A | 10/1998 | Skeirik | |
| 5,887,269 A | 3/1999 | Brunts et al. | |
| 5,930,474 A | 7/1999 | Dunworth et al. | |
| 5,982,897 A | 11/1999 | Clark | |
| 6,023,723 A | 2/2000 | McCormick et al. | |
| 6,052,709 A | 4/2000 | Paul | |
| 6,058,484 A | 5/2000 | Chapman et al. | |
| 6,072,942 A | 6/2000 | Stockwell et al. | |
| 6,088,803 A | 7/2000 | Tso et al. | |
| 6,154,172 A | 11/2000 | Piccionelli et al. | |
| 6,161,130 A | 12/2000 | Horvitz et al. | |
| 6,167,434 A | 12/2000 | Pang | |
| 6,182,223 B1 | 1/2001 | Rawson | |
| 6,202,158 B1 | 3/2001 | Urano et al. | |
| 6,249,807 B1 | 6/2001 | Shaw et al. | |

(Continued)

FOREIGN PATENT DOCUMENTS

WO  WO 01/71499 A1  9/2001

OTHER PUBLICATIONS

AirCERT web page, last updated Sep. 18, 2000 [online]. Cert.org [retrieved Apr. 18, 2003]. Retrieved from the Internet:URL:http://www.cert.org/kb/aircert/, U.S.A.

(Continued)

*Primary Examiner* — Philip Chea
*Assistant Examiner* — Trong Nguyen
(74) *Attorney, Agent, or Firm* — Fenwick & West LLP

(57) ABSTRACT

When a client receives a potential threat source (PTS), a user of the client may desire to make an informed decision regarding the PTS. The PTS can be, for example, an email or instant message with an embedded executable, a link to a network destination (e.g., included in search engine results or an email, or webpage), or an executable file (e.g., downloaded from a website). The PTS is identified and characterized to establish a threat rating. The threat rating can then be presented to the user, so as to inform the user as to the PTS riskiness. The threat rating is determined in light of the local security tools available. If there are no local security tools that mitigate the threat of the PTS, then a security tool that is known to mitigate the threat can be identified and recommended to the user.

20 Claims, 7 Drawing Sheets

U.S. PATENT DOCUMENTS

| | | |
|---|---|---|
| 6,253,169 B1 | 6/2001 | Apte et al. |
| 6,282,565 B1 | 8/2001 | Shaw et al. |
| 6,282,660 B1 | 8/2001 | Anne et al. |
| 6,289,416 B1 | 9/2001 | Fukushima et al. |
| 6,298,351 B1 | 10/2001 | Castelli et al. |
| 6,314,409 B2 | 11/2001 | Schneck |
| 6,324,569 B1 | 11/2001 | Ogilvie et al. |
| 6,347,310 B1 | 2/2002 | Passera |
| 6,370,526 B1 | 4/2002 | Agrawal et al. |
| 6,370,629 B1 | 4/2002 | Hastings et al. |
| 6,397,200 B1 | 5/2002 | Lynch, Jr. et al. |
| 6,397,215 B1 | 5/2002 | Kreulen et al. |
| 6,421,709 B1 | 7/2002 | McCormick et al. |
| 6,424,960 B1 | 7/2002 | Lee et al. |
| 6,442,606 B1 | 8/2002 | Subbaroyan et al. |
| 6,453,419 B1 | 9/2002 | Flint et al. |
| 6,456,991 B1 | 9/2002 | Srinivasa et al. |
| 6,480,885 B1 | 11/2002 | Olivier |
| 6,487,586 B2 | 11/2002 | Ogilvie et al. |
| 6,493,007 B1 | 12/2002 | Pang |
| 6,493,752 B1 | 12/2002 | Lee et al. |
| 6,502,082 B1 | 12/2002 | Toyama et al. |
| 6,505,167 B1 | 1/2003 | Horvitz et al. |
| 6,546,416 B1 | 4/2003 | Kirsch |
| 6,640,301 B1 | 10/2003 | Ng |
| 6,643,685 B1 | 11/2003 | Millard |
| 6,650,890 B1 | 11/2003 | Irlam et al. |
| 6,654,787 B1 | 11/2003 | Aronson et al. |
| 6,658,114 B1 | 12/2003 | Farn et al. |
| 6,687,740 B1 | 2/2004 | Gough |
| 6,691,156 B1 | 2/2004 | Drummond et al. |
| 6,697,942 B1 | 2/2004 | L'Heureux |
| 6,701,347 B1 | 3/2004 | Ogilvie |
| 6,711,608 B1 | 3/2004 | Ogilvie |
| 6,732,157 B1 | 5/2004 | Gordon et al. |
| 6,757,713 B1 | 6/2004 | Ogilvie et al. |
| 6,757,830 B1 | 6/2004 | Tarbotton et al. |
| 6,859,791 B1 | 2/2005 | Spagna et al. |
| 6,901,346 B2 | 5/2005 | Tracy et al. |
| 6,928,553 B2 | 8/2005 | Xiong et al. |
| 7,010,696 B1* | 3/2006 | Cambridge et al. .......... 713/188 |
| 7,055,027 B1 | 5/2006 | Gunter et al. |
| 7,096,368 B2 | 8/2006 | Kouznetsov et al. |
| 7,155,484 B2 | 12/2006 | Malik |
| 7,299,351 B2 | 11/2007 | Huitema et al. |
| 2002/0016831 A1 | 2/2002 | Peled et al. |
| 2002/0038308 A1 | 3/2002 | Cappi |
| 2002/0042687 A1 | 4/2002 | Tracy et al. |
| 2002/0083343 A1 | 6/2002 | Crosbie |
| 2002/0087641 A1 | 7/2002 | Levosky |
| 2002/0087649 A1 | 7/2002 | Horvitz |
| 2002/0087882 A1 | 7/2002 | Schneier et al. |
| 2002/0120848 A1 | 8/2002 | Mont et al. |
| 2002/0133343 A1 | 9/2002 | Ambler et al. |
| 2002/0138525 A1 | 9/2002 | Karadimitriou et al. |
| 2002/0138581 A1 | 9/2002 | MacIntosh et al. |
| 2002/0147694 A1 | 10/2002 | Dempsey et al. |
| 2002/0147782 A1 | 10/2002 | Dimitrova et al. |
| 2002/0156902 A1 | 10/2002 | Crandall |
| 2002/0157020 A1 | 10/2002 | Royer |
| 2002/0165912 A1 | 11/2002 | Wenocur et al. |
| 2002/0199095 A1 | 12/2002 | Bandini et al. |
| 2002/0199186 A1 | 12/2002 | Ali et al. |
| 2002/0199194 A1 | 12/2002 | Ali |
| 2003/0009699 A1 | 1/2003 | Gupta et al. |
| 2003/0018891 A1 | 1/2003 | Hall et al. |
| 2003/0033587 A1 | 2/2003 | Ferguson et al. |
| 2003/0037251 A1 | 2/2003 | Frieder et al. |
| 2003/0046128 A1* | 3/2003 | Heinrich ........................... 705/7 |
| 2003/0051026 A1 | 3/2003 | Carter |
| 2003/0105864 A1 | 6/2003 | Mulligan et al. |
| 2003/0149726 A1 | 8/2003 | Spear |
| 2003/0167311 A1 | 9/2003 | Kirsch |
| 2003/0191969 A1 | 10/2003 | Katsikas |
| 2003/0200334 A1 | 10/2003 | Grynberg |
| 2003/0220978 A1 | 11/2003 | Rhodes |
| 2003/0229672 A1 | 12/2003 | Kohn |
| 2003/0229801 A1 | 12/2003 | Kouznetsov et al. |
| 2003/0233415 A1 | 12/2003 | Beyda |
| 2004/0003283 A1 | 1/2004 | Goodman et al. |
| 2004/0015725 A1 | 1/2004 | Boneh et al. |
| 2004/0024823 A1 | 2/2004 | Del Monte |
| 2004/0054887 A1 | 3/2004 | Paulsen et al. |
| 2004/0064734 A1 | 4/2004 | Ehrlich |
| 2004/0068534 A1 | 4/2004 | Angermayr et al. |
| 2004/0073617 A1 | 4/2004 | Milliken et al. |
| 2004/0073810 A1* | 4/2004 | Dettinger et al. ............. 713/201 |
| 2004/0093383 A1 | 5/2004 | Huang et al. |
| 2004/0093384 A1 | 5/2004 | Shipp |
| 2004/0111480 A1 | 6/2004 | Yue |
| 2004/0148358 A1 | 7/2004 | Singh et al. |
| 2004/0177271 A1 | 9/2004 | Arnold et al. |
| 2004/0181665 A1 | 9/2004 | Houser |
| 2004/0187023 A1* | 9/2004 | Alagna et al. ................. 713/200 |
| 2004/0205173 A1 | 10/2004 | Hall |
| 2005/0015455 A1 | 1/2005 | Liu |
| 2005/0097179 A1 | 5/2005 | Orme |
| 2005/0144480 A1 | 6/2005 | Kim et al. |
| 2006/0005239 A1 | 1/2006 | Mondri et al. |
| 2006/0075504 A1* | 4/2006 | Liu ................................ 726/25 |
| 2007/0169190 A1 | 7/2007 | Kolton et al. |
| 2007/0208822 A1* | 9/2007 | Wang et al. ................... 709/217 |
| 2008/0172382 A1* | 7/2008 | Prettejohn ......................... 707/6 |

OTHER PUBLICATIONS

Analysis Console for Intrusion Detection (ACID) web page [online]. Andrew.cmu.edu [retrieved Apr. 18, 2003]. Retrieved from the InternetURL:http://www.andrew.cmu.edu/~rdanyliw/snort/snortacid.html, U.S.A.

Basis Technology's Rosette Language Identifier, 2 pages, downloaded from http://www.basistech.com/language-identification/ on Aug. 25, 2005, U.S.A.

"Caltarian Security Technology Platform," Riptech web pages [online]. Symantec.com [retrieved Apr. 18, 2003]. Retrieved from the Internet: URL:http://enterprisesecurity.symantec.com/Content/displayPDF.cfm?SSSPDFID=35&EID=O, U.S.A.

cauce.org web pages [online]. Coalition Against Unsolicited Commercial Email [retrieved Mar. 17, 2003]. Retrieved from the Internet: <URL: http://www.cauce.org/about/problem.shtml>.

Cavnar, William B. et al., "N-Gram Based Text Categorization," Proceedings of the SDAIR-94, $3^{rd}$ Annual Symposium on Document Analysis and Information Retrieval, Las Vegas, NV, USA, Apr. 13, 1994.

Change log for Analysis Console for Intrusion Detection (Acid), indicating release date of Sep. 8, 2000 [online]. Andrew.cmu.edu [retrieved Apr. 18, 2003]. Retrieved from the Internet:URL:http://www.andrew.cmu.edu/~rdanyliw/snort/CHANGELOG, U.S.A.

Chung, C., Gertz, M. and Levitt, K., "DEMIDS: A Misuse Detection System for Database Systems," Department of Computer Science, University of California at Davis, Oct. 1, 1999, pp. 1-18.

Cranor, Faith L., LaMacchia Brian A., "Spam!" Communications of the ACM, vol. 41, No. 8, pp. 74-83, Aug. 1998, U.S.A.

CyberGuard Corporation, "*CyberGuard and Webwasher: The Value Proposition*," A CyberGuard Corporation White Paper, May 2004, 6 pages.

e=Security, Inc., Correlation Technology for Security Event Management, Oct. 7, 2002 [online]. eSecurityins.com [retrieved Apr. 18, 2003]. Retrieved from the Internet:URL:http//www.esecurity.com/downloads/Correlation_WP.pdf, Vienna, VA.

How it Works: Spam Recognition, http://www.death2spam.net/docs/classifier.html, retrieved Aug. 18, 2005, U.S.A.

Karp-Rabin algorithm, 3 pages, downloaded from http://www-igm.univ-mlv.fr/~lecroq/string/node5.html on Sep. 1, 2005, U.S.A.

Kularski, C., "Compound Procedures for Spam Control," Highland School of Technology, Jan. 2004.

Lee, Sin Yeung; Low, Wai Lup and Wong, Pei Yuen, "Learning Fingerprints for a Database Intrusion Detections System," Computer Security Laboratory, DSO National Laboratories, Singapore, ESORICS Nov. 2002, LNCS 2502, pp. 264-279.

Low, Wai Lup, et al., "DIDAFIT: Detecting Intrusions in Databases Through Fingerprinting Transactions," ICEIS 2002, Fourth International Conference on Enterprise Information Systems, vol. 1, Apr. 3-6, 2002, pp. 121-128, Ciudad Real, Spain.

Marketing, "*Digital Certificates—Best Practices—A Microdasys Whitepaper*," bestptractice.doc, Revision 1/1 (Jul. 31, 2003), 6 pages, Czech Republic.

Microdasys, "*SCIP Secured Content Inspection: Protecting the Enterprise from CryptoHacks*," 2003 by Microdasys Inc., 2 pages, Czech Republic.

MyNEtWatchman.com web pages indicating 9/00 beta release [online]. MyNetWatchman.com [retrieved Apr. 18, 2003]. Retrieved from the Internet: URL:http://www.mynetwatchman.com/mynetwatchman/relnotes.htm, Alpharetta, GA.

NBEC/NWOCA Anti-Spam Tools, [online] [retrieved Jul. 7, 2004] retrieved from http://home.nwoca.org, Jul. 7, 2004.

Network Computing Solutions—"*Microdasys SCIP*" [online]. Retrieved on Mar. 18, 2005. Retrieved from the Internet:URL:http://www.ncs.cz/index.php?language=en&menuitem-4&subitem=13, 2 pages, Czech Republic.

Network Computing Solutions—NSC Homepage—*News* [online]. Retrieved on Mar. 18, 2005. Retrieved from the Internet:URL:http://www.nsc.cz/index.php?language=en&menuitem=0&subitem=4 &subitem=13, 3 pages, Czech Republic.

"N-Gram Based Text Categorization," 2 pages, downloaded from http://citeseer.ist/psu.edu/68861.htm, Aug. 25, 2005 U.S.A.

Outlook.spambully.com web pages [online] Spam Bully [retrieved Jan. 16, 2003] Copyright 2002, Retrieved from the Internet<URL:http://outlook.spambully.com/about.php>.

The Rabin-Karp algorithm, String searching via Hashing, 5 pages, downloaded from http://www.eecs.harvard.edu/~ellard/Q-07/HTML/root/node43 on Aug. 31, 2005 U.S.A.

Rabin-Karp string search algorithm, 5 pages, downloaded from http://en.wikipedia.org/wiki/Rabin-Karp_string_search_algorithm on Aug. 31, 2005 U.S.A.

Schneier, Bruce, Managed Security Monitoring: Network Security for the 21$^{st}$ Century, 2001 [online]. Counterpane.com [retrieved Apr. 18, 2003]. Retrieved from the Internet:URL:http://www.counterpane.com/msn.pdf, U.S.A.

SCIP Product, Microdasys—"*The need to control, inspect and manage encrypted webtraffic*." [online]. Retrieved on Mar. 18, 2005. Retrieved from the Internet:URL:http://www.microdasys.com/scipproduct+M54a708de802.html. Author unknown, 2 pages, Czech Republic.

Slashdot.org web pages describing Dshield, dated Nov. 27, 2000 [online]. Slashdot.org [retrieved Apr. 18, 2003]. Retrieved from the Internet: URL:http://slashdot.org/article.pl?sid=00/11/27/1957238&mode=thread, U.S.A.

Spam Assissin, The Apache SpamAssasin Projectm, 2 pages, downloaded from http://spamassassin.apache.org on Aug. 25, 2005, U.S.A.

"*SSL Stripper Installation Guide*," [online]. Retrieved in Mar. 2005 from the Internet:URL:http://www.sslstripper.com, 2 pages, U.S.A.

SSL Stripper Home Page, "*Security Solutions: SSL Stripper*," [online]. Retrieved on Mar. 18, 2005. Retrieved from the Internet:URL:http://www.vroyer.org/sslstripper/index.html, 2 pages, Oct. 15, 2004, U.S.A.

SSL Stripper Sample Screenshots, "*Security Solutions: Sample Screenshots*," [online]. Retrieved on Mar. 18, 2005. Retrieved from the Internet:URL:http://www.vroyer.org/sslstripper/screenshots.html, 3 pages, Oct. 15, 2004, U.S.A.

"Technical Responses to Spam," Nov. 2003, Taughannock Networks.

TextCat Language Guesser, 2 pages, downloaded from http://odur.let.rug.nl/~vannord/Textcat/ on Aug. 25, 2005, U.S.A.

Web page, announcing Nov. 11, 2000 release of Dshield [online]. Deja.com [retrieved Apr. 18, 2003]. Retrieved from the Internet:URL:http://groups.google.com/groups?selm=8vm48v%245pd%241%40nnrp1.deja.com&oe=UTF-8&output=gplain, U.S.A.

Webwasher AG/Full feature set, "*Full feature set*," [online]. Retrieved on Mar. 18, 2005. Retrieved from the Internet:URL:http://www.webwasher.com/enterprise/products/webwasher_products/ssl_scanner/full_feature_set.html?I . . . , 2 pages.

Webwasher AG/Webwasher 1000 CSM Appliance, "*Webwasher 1000 CSM Appliance*," [online]. Retrieved on Mar. 18, 2005. Retrieved from the Internet:URL:http://www.webwasher.com/enterprise/products/webwasher_products/scm_appliance/index . . . 2 pages.

Webwasher AG/Webwasher URL Filter, "*Webwashter URL Filter*," [online]. Retrieved on Mar. 18, 2005. Retrieved from the Internet: URL:http://www.webwasher.com/enterprise/products/webwasher_products/webwasther_url_filter.. 1 page.

Webwasher AG/Webwasher Anti Virus, "*Webwasher Anti Virus*," [online]. Retrieved on Mar. 18, 2005. Retrieved from tdhe Internet:URL:http:/www.webwashter.com/enterprise/products/webwasher_products/anti_virus/index.html . . . , 2 pages.

Webwasher AG/Webwasher Anti Spam, "*Webwasher Anti Spam*," [online]. Retrieved on Mar. 18, 2005. Retrieved from the Internet:URL:http://www.webwashter.com/enterprise/products/webwasher_products/anti_spam/index.htm . . . , 1 page.

Webwasher AG/Webwasher Content Protection,"*Webwasher Content Protection*," [online]. Retrieved on Mar. 18, 2005. Retrieved from the Internet:URL:http://www.webwashter.com/enterprise/products/webwasher_products/content _protection/index.html, 2 pages.

Webwasher AG/Webwasher SSL Scanner, "*Webwasher SSL Scanner*," [online]. Retrieved on Mar. 18, 2005. Retrieved from the Internet:URL:http://www.webwasher.com/enterprise/products/webwasher_products/ssl_scanner/index.html, 2 pages.

Wikipedia.org web pages (online). Wikipedia (retrieved Mar. 17, 2003). Retrieved from the Internet: <URL: http://www.wikipedia.org/w/wiki.phtml?title= Machine learning & printable=yes>.

2000 Review of eSecurity product on Network Security web page [online]. SCMagazine.com [retrieved Apr. 18, 2003]. Retrieved from the Internet: <URL:http://www.scmagazine.com/scmagazine/2000_12/testc/network.htm#Open>.

Archive of Royer, V., "SSLStripper," www.vroyer.com, [Online] [Archived by http://archive.org on Jul. 30, 2004; Retrieved on Sep. 22, 2009] Retrieved from the Internet<URL:http://web.archive.org/web/20040730014213/http://www.vroyer.org/>.

* cited by examiner

SECURITY THREAT REPORTING IN LIGHT OF LOCAL SECURITY TOOLS

RELATED APPLICATIONS

This application is related to U.S. application Ser. No. 11/020,514, filed Dec. 21, 2004, titled "Presentation of Network Source and Executable Characteristics," which is herein incorporated in its entirety by reference.

FIELD OF THE INVENTION

The invention relates to computer security, and more particularly, to techniques for allowing a user to make an informed decision with regard to a potential security threat.

BACKGROUND OF THE INVENTION

Computer users are under constant threats from various computer and network sources. For example, a user may receive a communication such as an electronic mail (email) that includes a link to a particular web site or an embedded executable. Although many such web sites and executables present no threat to the user, consider the possible scenario. The user accesses a web site via an emailed link. The web site claims to be a legitimate entity (such as one known to the user) and requests important information (e.g., credit card, social security, or bank account number) from the user. The web site, however, is actually mimicking a legitimate site and has been setup to misappropriate personal information. Such a fraudulent activity is often referred to as phishing.

In another example, a user may receive executable code from a network destination such as a website or other source. Unbeknownst to the user, the executable code is or otherwise includes a malicious program such as a spyware, adware, Trojan horse, virus, worm, or keyboard-logging program. Such executable code is generally referred to as malicious software (malware), and oftentimes poses a significant threat to the security of the user's computer system and/or personal information. Users also face other possible threats, including fraudulent domain names pretending to be legitimate entities, web sites that sell deceptive products or services, and network sources that generate spam, pop-up ads, and other undesirable activities.

One technique for mitigating the threats is to install security appliances (e.g., hardware firewall), as well as security software (e.g., antivirus, software firewall) to detect the presence of worms, viruses, and other malicious programs. However, such tools fail to properly inform, or at least under inform the user as to the nature of perceived security threats. For example, if a particular threat is unknown to the local tools, no action is taken and no reporting to user is carried out.

What is needed, therefore, are techniques that allow a user to make an informed decision regarding a potential threat from a source.

SUMMARY OF THE INVENTION

One embodiment of the present invention provides a computer implemented methodology for threat reporting in light of local security tools. The method includes receiving a potential threat source (PTS), and determining security threats associated with the PTS. The PTS can be, for example, a link to a network destination or an executable file. In response to determining that a security threat associated with the PTS is mitigated by local security, the method continues with designating that security threat as a mitigated threat. The method further includes determining a threat rating of the PTS based on unmitigated security threats, and providing the threat rating to the user. The method may include suggesting procurement of security tools to user that would mitigate or lower the threat rating. The method may include identifying one or more characteristics of the PTS, and determining the security threats associated with the PTS based on the characteristics. In response to determining that a security threat is not mitigated by local security, the method may include designating that security threat as an unmitigated threat. In one such case, the method further includes determining one or more security tools that would mitigate the unmitigated security threat. Note here that the method may further include suggesting procurement of the one or more security tools to user to improve the threat rating. Providing the threat rating to the user may include, for example, providing a graphical indicator of the threat.

Another embodiment of the present invention provides a machine-readable medium (e.g., one or more compact disks, diskettes, servers, memory sticks, or hard drives) encoded with instructions, that when executed by one or more processors, cause the processor to carry out a process for threat reporting in light of local security tools. This process can be, for example, similar to or a variation of the previously described method.

Another embodiment of the present invention provides a system for threat reporting in light of local security tools. The system functionality (e.g., such as that of the previously described method or a variation thereof) can be implemented with a number of means, such as software (e.g., executable instructions encoded on one or more computer-readable mediums), hardware (e.g., gate level logic or one or more ASICs), firmware (e.g., one or more microcontrollers with I/O capability and embedded routines for carrying out the functionality described herein), or some combination thereof. The system can be implemented in a client-server environment, with some threat reporting functionality carried out, for example, at the server and some at the client, or all at the client.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF THE INVENTION

Techniques are disclosed that allow a user to make an informed decision regarding a potential threat source.

System Architecture

Figure 1:
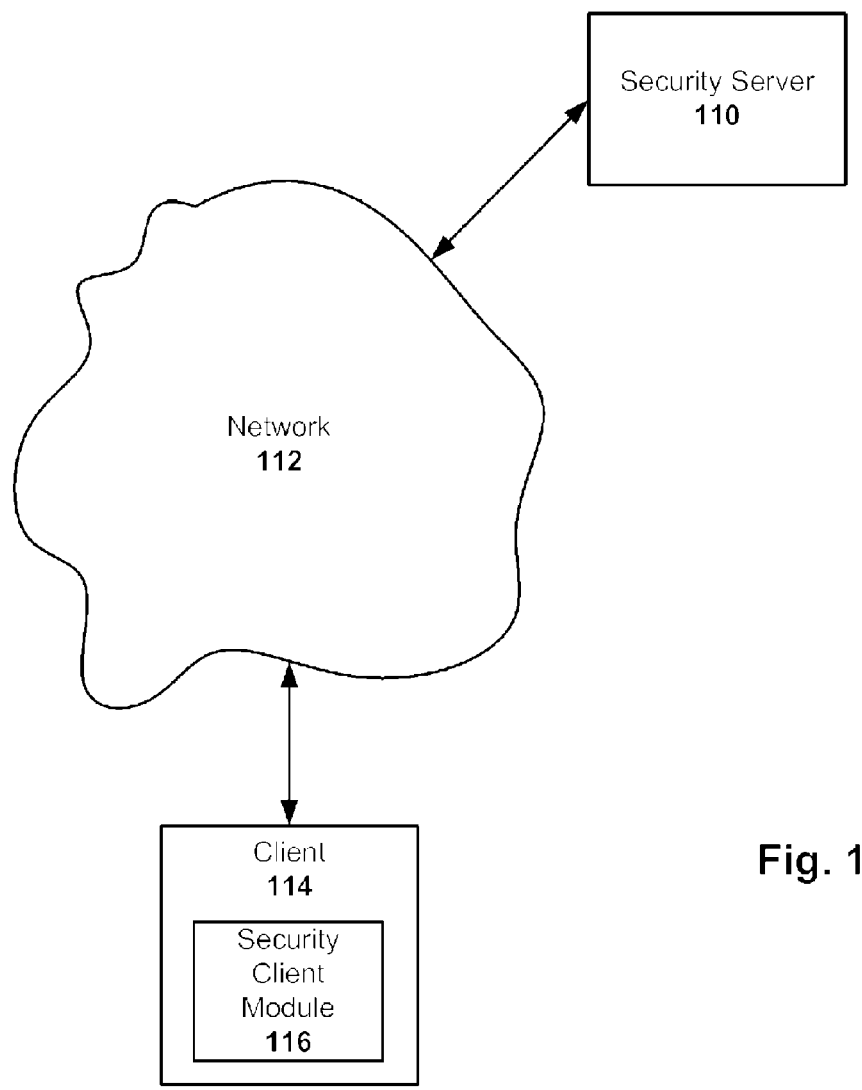
FIG. 1 is a block diagram of a computing environment configured in accordance with one embodiment of the present invention.

FIG. 1 is a block diagram of a computing environment configured in accordance with an embodiment of the present invention. As can be seen, the computing environment includes a security server 110 connected to a network 112. The network 112 is also connected to one or more client computers 114, each of which includes a security client module 116. Alternative embodiments can be implemented within a single machine, such as within client 114 without interaction with server 110.

The network 112 may be any type of communications network, such as a local area network (e.g., intranet), wide area network (e.g., Internet), or some combination thereof. Alternatively, the network 112 may be a direct connection between a client computer 114 and the security server 110. In general, the client computers 114, network 112, and/or the security server 110 may be in communication via any type of wired or wireless connection, using a wide variety of communication protocols (e.g., TCP/IP, HTTP, SMTP, FTP), encodings or formats (e.g., HTML, XML), and protection schemes (e.g., VPN, secure HTTP, SSL). Alternatively, the security server 110 may indirectly communicate with the client computer 114 via U.S. mail or other such delivery service, where a processor readable medium (e.g., compact disk or floppy disk) is sent to the address where one of the clients 114 is located. This processor readable medium can be encoded with instructions and/or data files that can be loaded, executed and/or otherwise used by the client 114.

The security server 110 is provided by a security product vender (e.g., software, appliances, and/or services) or other such entity. The security server 110 can include one or more standard computer systems configured to communicate with client computers 114 via the network 112. For example, the security server 110 can include a web server, FTP server, or other technology that enables the security server 110 to interact with the client computers 114 via the network 112. In one embodiment, the security server 110 provides signatures and code to the client computers 114, for detecting malicious software including malware executables or executables infected with malware. In addition, the security server 110 provides signatures and code to the client computers 114, for identifying potential threat sources such as links to network destinations associated with various security issues or executable files/applications associated with various security issues.

The client computer 114 is a computing device that can have any number of applications, operating systems, etc, as well as various forms of malware (e.g., stand-alone malware that executes independently of other programs, or parasitic malware that surreptitiously embeds or otherwise attaches itself to legitimate programs). In one embodiment, the client computer 114 is a conventional computer system executing, for example, a Microsoft Windows-compatible operating system (OS), Apple OS X, and/or a Linux distribution. In another embodiment, the client computer 114 is device having computer functionality, such as a personal digital assistant (PDA), cellular telephone, smartphone, video game system, etc. Such a client computer 114 typically has the capability to receive messages from external sources (e.g., email, text messages, instant messages, etc) and access local and/or remote network locations (e.g., on network 112 or some other network). Although only one client computer 114 is shown in FIG. 1, note that other embodiments may have multiple clients (e.g., thousands or millions of such clients).

Malware is generally defined as software that can execute on the client computer 114 surreptitiously or that has some surreptitious functionality. Malware can take many forms, such as parasitic viruses that attach to legitimate files, worms that exploit weaknesses in the computer's security in order to infect the computer and spread to other computers, Trojan horse programs that appear legitimate but actually contain hidden malicious code, and spyware that monitors keystrokes and/or other actions on the computer in order to capture sensitive information or display advertisements. The executable file that hosts the malicious software can be modified with one or more packers in order to make the malicious software difficult to detect. Such malware is typically inadvertently imported into a client 114 via external communications, such as those communications that take place when accessing and/or downloading from websites, or those received in the form of emails, text messages, instant messages, and the like. Other types of malware can remotely operate on a client 114 (e.g., from some network destination accessed via a browser application running on the client) to conduct malicious activity (e.g., port scanning to seek out vulnerabilities for possible exploitation).

The client computer 114 executes a security client module 116 for detecting the presence of malicious software, determining a threat rating associated with each type of malware identified, and communicating that threat rating to the user, so that the user can make an informed decision as to what action to take. The security client module 116 may further provide recommendations to the user as to how to lower or otherwise handle the threat rating. For instance, if the detected malware could be mitigated (e.g., deleted or otherwise defeated) by a security tool that the user does not currently have, then the security client module 116 could further recommend the user to acquire that security tool so as to lower the threat rating to an acceptable level. The security client module 116 could further provide a link so as to facilitate purchasing of that security tool, if so desired. The security module 116 can be, for example, incorporated into the OS of the computer or part of a separate comprehensive security package.

In one embodiment, the security client module 116 is provided by the entity that operates the security server 110. The security client module 116 can communicate with the security server 110 via the network 112 in order to download code, signatures and/or other information utilized to detect and evaluate malicious software, inform user of threat ratings, and provide any recommendations. The security client module 116 may also collect information regarding a potential threat source, and provide that information to the security server 110 for further evaluation. The security server 110 can then provide a threat rating and/or recommendation to the security client module 116, which can then communicate with the user as needed. Alternatively, the threat rating can be computed by the security client module 116, based on local cached information or information received from server 110. The security client module 116 will be discussed in further detail with reference to FIGS. 3, 5, and 6a-c. The security server 110 will be discussed in further detail with reference to FIGS. 4 and 5.

Figure 2:
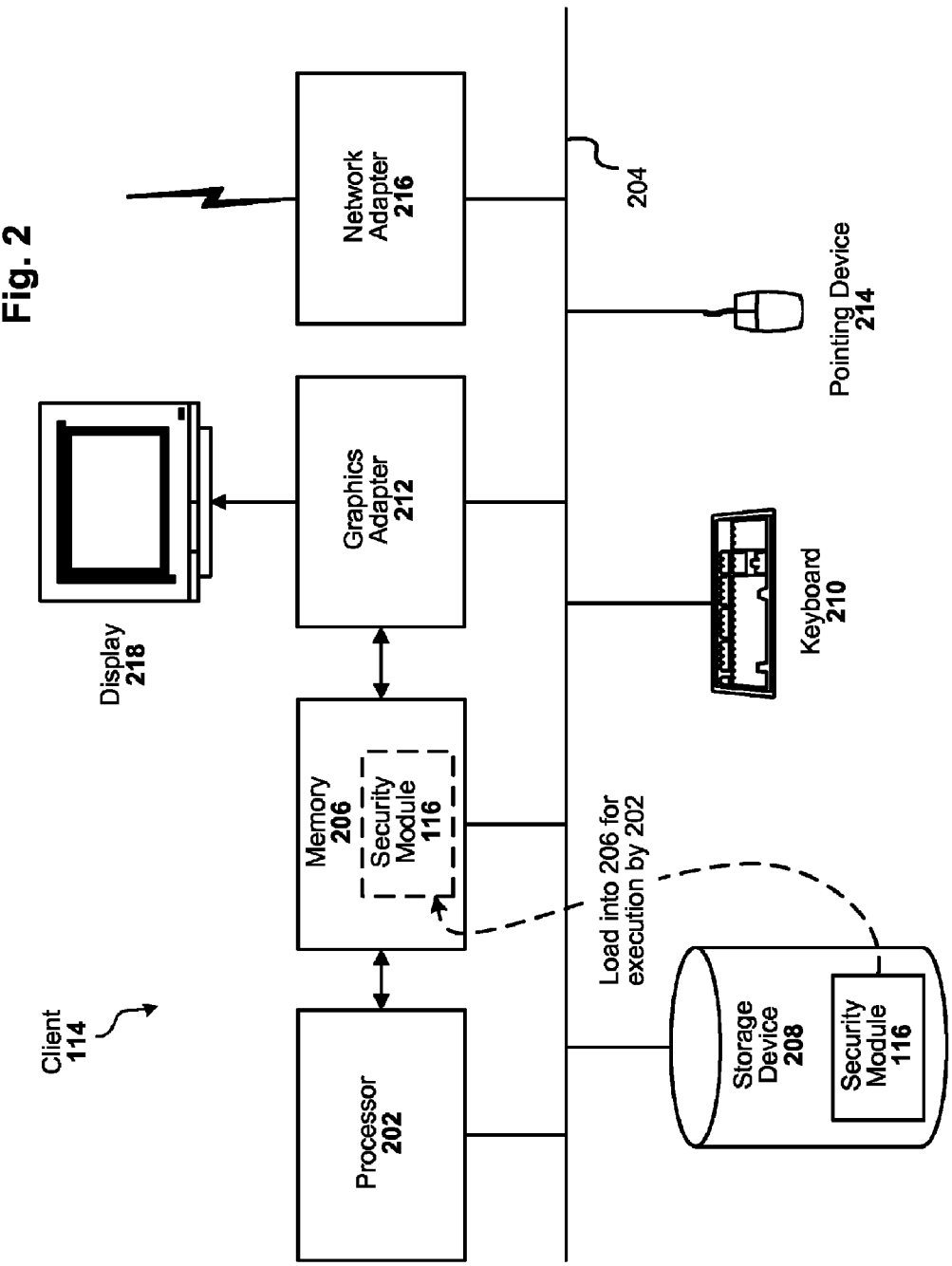
FIG. 2 is a block diagram illustrating a functional view of a client computer 114 configured in accordance with an embodiment of the present invention.

FIG. 2 is a block diagram illustrating a functional view of a client computer 114 configured in accordance with an embodiment of the present invention. As can be seen with this example, the client computer 114 includes a processor 202 operatively coupled via a bus 204 to a memory 206, a storage device 208, a keyboard 210, a graphics adapter 212, a pointing device 214, and a network adapter 216. A display 218 is operatively coupled to the graphics adapter 212.

The processor 202 may be any CPU or other processor that is capable of executing the various operating systems and applications/drivers of the client computer 114. Numerous suitable processors (e.g., Intel Pentium and AMD K processors) will be apparent in light of this disclosure. The memory 206 may be, for example, firmware ROM, RAM, and/or flash memory, and holds instructions and data used by the processor 202. The storage device 208 is a hard disk drive in one embodiment, but can also be any other device capable of persistently storing data, such as a writeable compact disk or DVD, and/or a solid-state memory device. The storage device 208 can hold multiple files containing executable code and/or data, as is typically done. The computer 114 can load an executable file into memory 206 and execute it using the processor 202. An executable file that is loaded into memory 206 for execution is referred to as a "process." The file on the storage device 208 from which the process was loaded is said to "host" the process. In the example shown in FIG. 2, the security module 116 is stored in storage device 208, and is loaded into memory 206 for execution by the processor 202.

The files stored on the storage device 208 can be, for example, in the Microsoft Windows Portable Executable (PE) format. Typically, a PE file is of type .EXE, indicating that the file is an executable file, or .DLL, indicating that the file is a dynamic link library (DLL) that can be executed by other files. The PE file header holds a data structure containing fields that provide basic information about the file. One such field is BaseOfImage, which describes the preferred base address in the address space of the process to which the OS should map the executable file image. Another field is SizeOfImage, which indicates the amount of memory in the process's address space to reserve for the loaded executable image. Other file formats, such as those utilized by Apple Macintosh and Linux-based computers usually contain similar information.

The pointing device 214 may be a mouse, track ball, or other such user input device, and is used in combination with the keyboard 210 to input data into the computer 114, as is typically done. The graphics adapter 212 displays images and other information on the display 218. The network adapter 216 communicatively couples the computer 114 with the network 112 (e.g., via conventional wired or wireless technology, as is typically done).

The computer 114 is adapted to execute computer program modules for providing protective functionality described herein, including threat rating and reporting in light of local security tools, and/or matching unmitigated threats with one or more appropriate security tools. In this particular example, the term "module" refers to computer program logic for providing the specified functionality. Note, however, that other modules configured in accordance with the principles of the present invention can be implemented in hardware, firmware, software, or some combination thereof. It will be understood in light of this disclosure that the modules described herein represent one embodiment of the present invention. Certain embodiments may include other and/or different modules and functionality. In addition, the embodiments may lack modules described herein and/or distribute the described functionality among the modules in a different manner. In one embodiment, the modules are stored on the storage device 208 as executable files, loaded into the memory 206, and executed by the processor 202 as one or more processes.

Security Module

Figure 3:
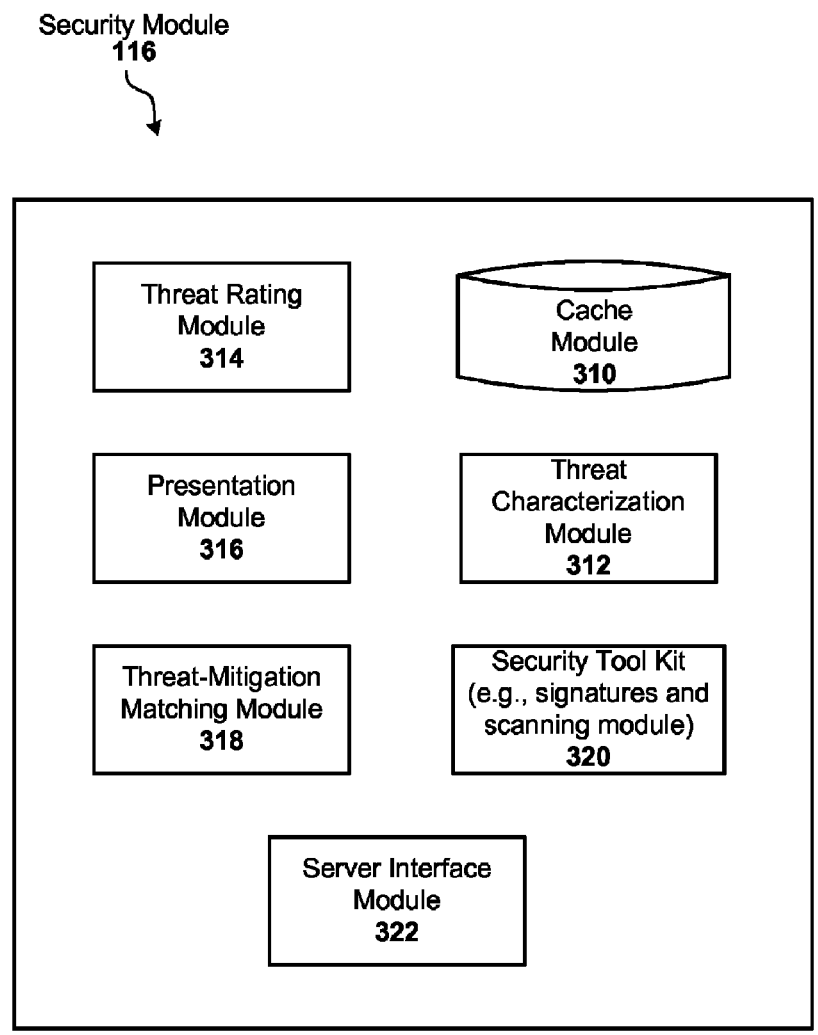
FIG. 3 is a block diagram illustrating modules within a security client module configured in accordance with an embodiment of the present invention.

FIG. 3 is a block diagram illustrating modules within the security client module 116 configured in accordance with an embodiment of the present invention. As can be seen, the security client module 116 includes a cache module 310, a threat characterization module 312, a threat rating module 314, a presentation module 316, threat-mitigation matching module 318, a security tool kit 320, and a server interface module 322. As previously explained, each of these components can be implemented in software that executes on a processor of a client computer. However, other embodiments could be implemented, for example, in hardware (such as in gate level logic), or in a combination of software and gate level logic. Numerous configurations will be apparent in light of this disclosure.

In operation, and in accordance with one embodiment of the present invention as discussed with reference to FIGS. 1 and 2, the client 114 receives a potential threat source (PTS) via the network adapter 216. The PTS can be, for example, an email or instant message with an embedded executable, a link to a network destination (e.g., included in search engine results or an email, or webpage), an executable file (e.g., downloaded from a website), or any other types of communication capable of being received and processed by the client 114. Note that the source may be located within the client 114 as well (e.g., executable code previously stored locally or a "favorites" link to a website saved in a browser application). In any case, the PTS is identified and characterized so that a threat rating can be established. The threat rating can then be presented to the user, so as to inform the user as to the riskiness/trustworthiness of the PTS. In one particular embodiment, the threat rating is determined in light of the local security tools available, such that if a PTS is associated with a particular threat that is readily mitigated by the available local security tools, then that PTS will not be factored into the treat rating. If there are no local security tools that mitigate the threat of the PTS, then a security tool that is known to mitigate the threat (if locally available) can be matched to the threat. If a match is found, that that security tool can be recommended to the user (e.g., to lower the threat rating of the subject PTS and/or improve overall system security).

The threat characterization module 312 identifies one or more characteristics of the received PTS, including an ID such as the name of the PTS (e.g., filename or network link name such as URL). With regard to executables, other example characteristics include the PTSs origin (e.g., from a disk or over a network via a browser, email, or file sharing, etc), how long the PTS has been stored in the client 114, whether the client 114 previously executed or otherwise interacted with the PTS without a harmful result, and whether the PTS is corrupted or infected with malware. With regard to network links, other example characteristics include whether the user has previously visited the PTS (e.g., website) via the client 114, how frequently the user has visited the PTS as well as the date and time of the last visit, how frequently the user has visited the PTS without any harmful result, whether the PTS has engaged in phishing scams or other known malicious behavior, and the general reputation of the PTS owner (e.g., website of blue-chip company is less risky than the website of an unknown company). Such PTS characteristics can be learned over time (e.g., based on observation and/or heuristics and/or input from other sources, including the user and third parties). In any case, these characteristics can then be used to determine the PTSs threat rating. The threat characterization module 312 can obtain such characteristics, for example, locally if available (e.g., from cache module 310 or other suitable storage) and/or remotely (e.g., from the security server 110).

In one particular embodiment, a database of known PTSs is provided at the server 110. The database can be regularly updated as new PTSs are identified and characterized, and indexed by a unique PTS ID such as by PTS name (e.g., executable filename or link name such as URL) or other suitable ID mechanism. Thus, once the threat characterization module 312 identifies the PTS ID, the threat characterization module 312 can then query (e.g., via the server interface module 322) the security server 110 with an identified PTS ID. Characteristics associated with that PTS ID would then be looked-up and returned to the security module for further processing (e.g., for use in calculating a threat rating for that PTS). Note the query mechanism can be further configured to perform analysis on the provided PTS ID to identify likely alternates and derivations. For instance, a PTS having a filename of "BigThreat.exe" could be expanded to capture any filenames including "BigThreat" (with no extensions, to account for different types of executables, and also to account for related derivations of the PTS such as "BigThreat2"). Similarly, a PTS having a network destination link name of "www.freedownloads.com/games/song/tombraider.html" could be expanded to capture any link names including "www.freedownloads.com." As people tend to frequently use the same executables and network destinations, characteristics downloaded from server 110 for such PTSs can be cached or otherwise stored locally to the client 114 to reduce requests to server 110 (and the latency associated therewith). In such an embodiment, the threat characterization module 312 is programmed or otherwise configured to first check for characteristics of the identified PTS locally, and if they are unavailable, to then query server 110 for characteristics of the identified PTS. Note that expanded query techniques can be equally applied to local cache queries within the security module 116 as well. Once the threat characterization module 312 has received characteristics of the identified PTS, it communicates those characteristics to the threat rating module to determine a threat rating.

The threat rating module 314 is programmed or otherwise configured to receive characteristics of the identified PTS, and determine a threat rating for the PTS based on those characteristics. The threat rating module 314 may use the PTS characteristics to determine additional information about that PTS. For instance, if the PTS is an email, the threat rating module 314 may determine the IP address of the email source (e.g., an email server typically records the IP address from which an email was received in the email header information). Likewise, if the PTS is a link to a webpage (e.g., URL), the threat rating module 314 may determine the IP address of the web server associated with that link (e.g., PTS domain name can be used to identify an IP address). The threat rating module 314 can communicate such additional information to the server 110, and store the information in the cache module 310.

The threat rating module 314 can compute the threat rating in various ways. In one particular embodiment, the database of known PTSs maintained at the server 110 further includes any known actual threats. Thus, if a PTS in the database is associated with one or more actual threats, then the threat rating module 314 will set the threat rating for that particular PTS accordingly. For example, a known threat such as an aggressive virus or key logger, or a website previously connected with malicious activity (e.g., "www.red-cross.com" instead of "www.redcross.org"), would be assigned a relatively high threat rating (e.g., 4 out of 4). Any such substantial known actual threats can be expressly indicated in the database, and have a pre-computed threat rating commensurate with the threat.

Less explicit threats can be evaluated based on a one or more of the PTS characteristics. For example, a link to a web server geolocated to another country would be assigned a relatively low threat rating (e.g., 1 out of 4), assuming there were no other known security issues with the link. Likewise, a link to a web server or an executable not previously used by the user would be assigned a relatively low threat rating (e.g., 1 out of 4), assuming there were no other known security issues with the link or executable. On the other hand, a link to a web server geolocated to another country that has been accessed a number of times, one of which resulted in a malicious attack on client 114, would be assigned a higher threat rating (e.g., 2 or 3 out of 4). In one such embodiment, each PTS characteristic is assigned a weight, with negative characteristics being assigned a greater weight proportional to their negativity.

Table 1 demonstrates one example weighting scheme:

TABLE 1

| PTS | Characteristic | Weight |
| --- | --- | --- |
| Executable | Not previously executed/previously executed | −1/+1 |
| Executable | Recently executed with neg. result/no neg. result | −3/+1 |
| Executable | Downloaded from unknown site/trusted site | −1/+1 |
| Executable | Downloaded from site with 1 count of negative history | −2 |
| Executable | Downloaded from site with 2 counts of negative history | −4 |
| Executable | Downloaded from site with >2 counts of negative history | −5 |
| Executable | Newly stored on client/stored on client >3 months | −1/0 |
| Executable | Auto-scanned and detected known malware | −5 |
| Executable | Auto-scanned and detected unfixable malware | Block |
| Link | Site not prey visited/frequently visited with no neg. impact | −1/+2 |
| Link | Site previously visited with neg impact (aggressive pop-ups) | −2 |
| Link | Site previously visited with neg impact (browser hi-jack) | −4 |
| Link | Site is associated with Phishing or other malicious activity | −4 or −5 |
| Link | Site is known to mishandle personal information | −5 |
| Link | Site is unknown/Site is well-known blue-chip | −1/+2 |
| Link | Linked server is located in other country/user's country | −1/0 |
| Link | Linked server is an aggressive spammer | −2 |
| Link | Linked server is known to share email addresses with others | −3 |
| Link | Linked server employs dial-up or cable modem | −3 |
| Link | Link included in email from an IP address known for malware | −4 or −5 |
| Link | Link is expressly restricted from access by user preferences | Block |

As can be seen, the PTSs of this example include executables and links to network destinations. Some characteristics can have a negative or a positive weight, depending on the situation. For instance, the first executable characteristic can be 'not previously executed' (which receives a weight of −1), or can be 'have been previously executed' (which receives a weight of +1). Similarly, the first link characteristic can be 'not previously visited' (which receives a weight of −1), or can be 'have been previously visited' with no negative impact (which receives a weight of +2). Still other characteristic don't receive a weight per se, but effectively cause a pre-established action, such as a link that has been expressly restricted from access by user preferences (e.g., pre-established action is to Block site). If a number of characteristics apply to a particular PTS, the individual weights can then be added (other otherwise used) to compute an overall weight. For example, an executable can have the following characteristics: 'executable newly stored on client' (−1), 'downloaded from unknown site' (−1), and 'downloaded from a site with 1 count of negative history' (−2). In one particular embodiment, the total weight for this example PTS would be −4, which is the sum of the individual characteristic weights. Other such weighting schemes can be used as well, as will be apparent in light of this disclosure. Once the overall weight of the PTS is known (based on one or more characteristic weights), then a threat rating can be computed.

In one particular embodiment, the threat rating module 314 uses the overall weight of the PTS as that threat rating (e.g., when the weighting scale and threat rating scale correlate with one another on a 1:1 basis). Alternatively, the threat rating module 314 is configured to normalize the overall weight of the PTS into a scale of threat ratings. One example embodiment of the threat rating module 314 is configured to compute threat ratings as shown in Table 2.

TABLE 2

| Overall PTS Weight | Threat Rating |
|---|---|
| 0 or higher | 0 |
| −1 | 1 |
| −2 | 2 |
| −3 | 3 |
| −4 | 4 |
| −5 or lower | 5 |

Once the threat rating is determined based on the overall PTS weight, the threat rating module 314 can then adjust that threat rating based on local security tools that are available for that PTS, such as those included in the security tool kit 320. The threat-mitigation matching module 318 is programmed or otherwise configured to match identified PTSs with a security tool (e.g., antivirus or anti-spam software) or mechanism (e.g., browser security setting) that will effectively mitigate the threat. In one particular embodiment the threat-mitigation matching module 318 is a look-up table that cross-references or otherwise associates known threats with one more security tools/mechanisms that sufficiently mitigate the threat. Alternatively, the required security tools/mechanisms to mitigate a particular threat could be identified in the PTS database previously discussed (e.g., where the database is indexed by PTS ID, with each entry including PTS characteristics, any actual threats associated therewith, and security tools/mechanisms to mitigate those actual threats).

With a threat matched to a security tool/mechanism, the threat rating module 314 can check the security took kit 320 to determine if the required security tool/mechanism is locally available. If so, the initial threat rating for that threat is adjusted in light of the mitigation provided by that security tool/mechanism. For instance, assume that an executable is received that has a known attached virus. As such, the initial threat rating will be high (e.g., 5 out of 5). However, if the security tool kit 320 includes antivirus software that effectively eliminates that virus prior to it carrying out any malicious behavior, then the threat rating module 314 can downgrade that threat rating (e.g., from a 5 to a 1 or 0). For another example, assume that a link is received that is associated with a known spammer. As such, the initial threat rating will be moderate (e.g., 2 or 3 out of 5). However, if the security tool kit 320 includes anti-spam software, then the threat rating module 314 can downgrade that threat rating (e.g., to a 1 or 0). If the security tool kit 320 does not include anti-spam software, but it is known that the Internet service provider (ISP) or other such service available to the user provides anti-spam protection, then the threat rating module 314 can similarly downgrade that threat rating (note that reputation of the anti-spam service can also be considered before downgrading the threat rating). In one such embodiment, the security tool kit 320 further includes a list of suitable anti-spam sources that apply to the user (and/or any other such security services available to the user). Such anti-spam capability (or other external security protections) can be detected automatically (e.g., many common ISPs are known to provide robust anti-spam protection), or provided by the user (e.g., in response to queries by the threat mitigation module 318 via a user interface or other suitable mechanism). The adjusted threat rating can then be output to the presentation module 316. If the required security tool/mechanism is not locally available in the security took kit 320, then the threat rating module 314 can be further configured to output (to the presentation module 316) the particular security tools and/or mechanisms (e.g., by name or other identifier) that would mitigate the threat, if locally available.

Note that the threat rating module 314 and the threat characterization module 312 can be integrated into a single module, is so desired. For that matter, functionality of all or any of the modules could be integrated into a common module configured to carry out that functionality. Furthermore, note that in the embodiment shown, the treat rating is computed at the client 114. Alternative embodiments can have the treat rating computed at the server 110 and then provided to the client 114, or partially computed at both the server 110 and the client 114 and then assembled at the client 114. Numerous configurations will be apparent in light of this disclosure, and the present invention is not intended to be limited to any particular one or sub-set of such configurations.

The presentation module 316 will present an identified PTS and its threat rating (as well as any recommendations) to the user The cache module 310 can further store the threat ratings for future use by the presentation module 316. The presentation module 316 includes logic that determines how to present the PTS threat level (and/or the PTS characteristics) to the user of the client 114. The presentation module 316 provides the PTS and its threat level (and/or PTS characteristics) so that the user can make an informed decision as to whether the PTS should be accessed or otherwise used. The user can further decide what action to perform with regard to the PTS (e.g., launching an antivirus program, opening/blocking a link, submitting a web form, responding to an email with sensitive information, or allowing executable code to be downloaded and executed or blocking that executable code from download). Note that the user can pre-indicate desired decisions for certain PTSs using user preferences, such as blocking access to certain links and/or executables, so that the blocking decision is made automatically. Such user preferences can be set, for example, using a graphical user interface (GUI) provided by the presentation module 316 and/or a security module included in the security tool kit 320.

There are several ways for the presentation module 316 to present a PTS and its threat level. In one particular embodiment, the presentation module 316 is configured to provide visual and/or audible cues as part of the communication that is rendered to the user (e.g., highlighting a text or changing a background color of a web page or email). In such a case, the presentation module 316 can connect to, for example, a web browser, a file system browser, an instant messaging program, or an email program of the client 114, to modify the rendered communication in a way to alert the user that the identified PTS may be fraudulent or harmful. Thus, the presentation module 316 can change the color, font, or size of a link or content to alert the user.

In another embodiment, the presentation module 316 is configured to provide visual and/or audible warnings to the user independently of the rendered communication. For example, if the user moves a cursor of the pointing device 214 over to a suspect link included in an email, web page, or search results, the presentation module 316 may provide a pop-up or tool-tip like message on the display 218 warning that the link is associated with a fraudulent act (e.g., wrongfully soliciting or mishandling credit card information). Alternatively, or in addition to, the presentation module 316 can send an icon or other type of indicator to the program sourcing the display (e.g., such as a browser or file system) to show the PTS threat level itself, or threat characteristics associated with the PTS.

An example PTS threat level indicator is a thermometer-type or meter-type display that communicates the threat level of the PTS using a scale (e.g., 0 to 4, with 0 representing no threat and 4 representing a substantial threat). Such threat level indicators are shown in FIGS. 6a through 6d. Example indicators of threat characteristics that provide threat information to the user include a country indicator (e.g., a country flag icon) specifying the country in which the source is physically located, a dialup or cable indicator (e.g., a phone/cable modem icon) specifying that the source is using a dialup or cable modem to connect to the network 112, a threat rating indicator (e.g., a color, numeric scale, or thermometer-type display) specifying the reputation of the source, a blue-chip indicator that identifies the source as a well-established entity, or as being hosted on a web-hosting farm, and a known-compromised indicator specifying that the source is known to have engaged in a fraudulent act or otherwise compromised. Such indicators can appear next to the PTS itself and/or on a modified title bar, status bar, global task bar, tray area of the program, or in a pop-up window, and may further include images, sounds, and animations. Also, if the user cursors over such indicators, a tool-tip like message can provide additional information about the meaning of the indicator and/or the associated PTS.

The server interface module 322 enables communication between the security client module 116 and the security server 110 via the network 112. It may also be programmed or otherwise configured to send and receive information from processes on the local machine 114, or from other devices on the network 112. In one embodiment, the server interface module 322 retrieves PTS information (e.g., characteristics and/or threat rating) from the server 110 as needed, as previously explained. The server interface module 322 may also retrieve signatures of known malicious software from the server 110, and provide host files and suspect PTSs to the server 110 for analysis. Once the server interface module 322 receives PTS information and/or signatures and/or other security information and code from server 110, it updates the cache 310 and security tool kit 320 accordingly. Note that the security tool kit 320 may include a signatures database, or may be configured to store such signatures in cache module 310 or other suitable storage.

In one particular embodiment, the security took kit 320 includes a signature scanning module configured to scan any identified links as well as executables for the presence of the signatures in a signatures database. The signature scanning module can further analyze a link or file to identify its source or potential entry points and other locations likely to contain malicious software. The module scans these likely locations to determine whether they contain a signature from the signatures database or other indicators of malicious behavior. The signature scanning module may also perform analysis of a link or file, such as accessing the link or emulating instructions of the file within a virtual machine and then scanning the memory of the virtual machine for matching signatures. In this sense, local tools in the security took kit 320 can also be given a chance to provide test filters to confidently determine if those tools can properly mitigate the threat indicated. If the threat can be properly mitigated by one or more of the locally installed tools (based on test filters, diagnostic analysis, and any other such screening mechanisms), then the threat rating can be safely adjusted to a lower threat level. The security took kit 320 may further include a listing, database other such mechanism identifying known threats, including links to malicious sites, IP addresses and domain names of known malicious sites, and any other recognizable patterns or data that can be used to identify a known malicious source.

Security Server

Figure 4:
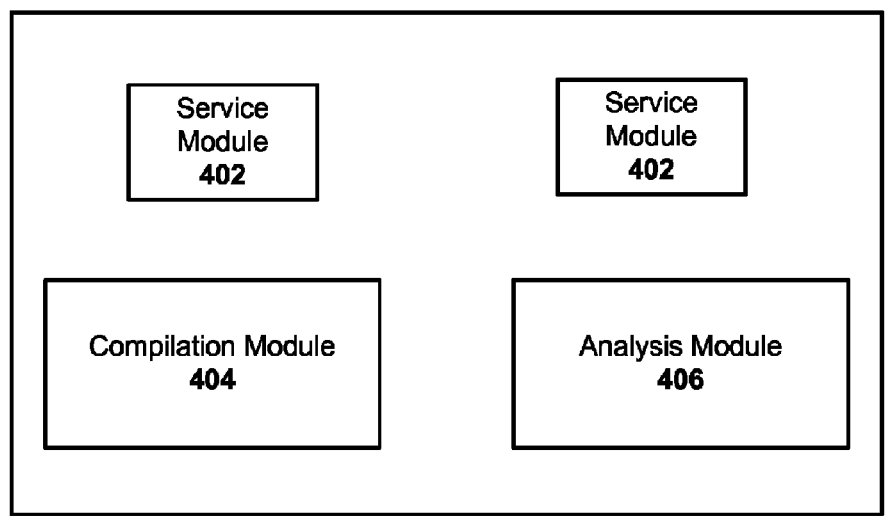
FIG. 4 is a block diagram illustrating modules within the server configured in accordance with an embodiment of the present invention.

FIG. 4 is a block diagram illustrating modules within the server 110 configured in accordance with an embodiment of the present invention. As can be seen, the server 110 includes one or more service modules 402, a compilation module 404, and an analysis module 406. Just as with the client security module 116, other embodiments of the server 110 can have different and/or other modules than the ones described herein. In addition, functionalities can be distributed among the modules in a manner different than described herein.

The compilation module 404 is programmed or otherwise configured to receive information regarding a PTS (e.g., IP address, domain name, and/or URL of the external source) from a client 114, and to access the service modules 402 to identify one or more characteristics of that PTS. The service modules 402 may be located within the server 110. Alternatively, one or more of the service modules 402 may be located within one or more other servers from which the compilation module 404 accesses to obtain the characteristic information.

The service modules 402 provide various resources and services that assist the compilation module 404 in identifying PTS characteristics. In one particular embodiment, the service modules 402 include a geolocation database. The geolocation database provides an estimation of a given IP address's physical location, which can be a PTS characteristic that the server 110 provides to the client 114. The service modules 402 can also provide or access a real-time black hole list (RBL). The compilation module 404 is programmed or otherwise configured to use the RBL to classify a PTS (e.g., an email server) as a known spam originator or as an open relay (which can be co-opted by spammers). The compilation module 404 can also use the RBL to classify a given IP address as being on a dial-up or cable modem, or similar medium indicating that the IP address is not maintained by a well-established entity using a more expensive network connection (e.g., a T-1 line).

The services 420 can also include a domain name service (DNS) (e.g., Whois or other such services) or trace routing database. The compilation module 404 can use such a database to determine that a given source's IP address is hosted on a free web-hosting farm. Many fraudulent parties use such farms to host their web sites and to perpetrate phishing or other malicious scams. On the other hand, well-established entities usually do not host their web sites on such web-hosting farms.

The services 420 can further include a web rating service that compiles statistics on a web site's traffic. The compilation module 404 can use this information to determine if a user can safely rely on a PTS's content; that is, a PTS's threat rating indicates whether the PTS can be relied on to not perpetrate a fraudulent act. Moreover, the compilation module 404 can use the DNS (e.g., Whois) or trace routing database to track an IP address's owner. The compilation module 404 can cross-reference the indicated owner with information about public entities to generate a rating that indicates the owner's trustworthiness.

Some other service modules 402 include a service that provides an external PTS's age (with an assumption being: the longer that a PTS is in existence, the more likely that it is reliable), a service that uses a web crawler to detect web sites that appear to duplicate contents of other legitimate web sites, and a service that provides a list of sources that are known to have compromised security and/or a list of legitimate sources that are known to have been compromised by fraudulent parties. The compilation module 404 utilizes these service modules 402 to identify and gather one or more characteristics regarding a PTS identified by the client 114. The compilation module 404 communicates the identified one or more characteristics of the source to the client 114, as previously explained.

In one particular embodiment of the present invention, the compilation module 404 provides the identified one or more characteristics of a PTS to the analysis module 406 of the server 110. The analysis module 406 weighs each of the characteristics and determines a threat rating representing a threat assessment for the PTS (e.g., as described with reference to the threat rating module 314 of the client security module 116). For example, if a PTS is from a dialup modem, is not physically located in the United States, and is an unknown provider, the analysis module 406 may determine a high threat rating for that PTS. The determined threat rating for a given PTS can also be considered a characteristic for that PTS, and can be communicated to the client security module 116 (e.g., presentation module 316) of the client 114 for presenting to the user and/or storage in the cache module 310. As previously explained, many functions suitable for weighing different characteristics and assigning a threat rating based on the weighted characteristics are possible as will be apparent in light of this disclosure. Communication between the server 110 and the client security module 116 can have any number of formats. In one particular embodiment, the format of the exchanged data is an extensible XML set containing information on the threat ratings associated with a network destination or executable. As will be apparent in light of this disclosure, the information exchanged may also include, for example, PTS characteristics, the PTS itself, security tools and definitions.

Methodology

Figure 5:
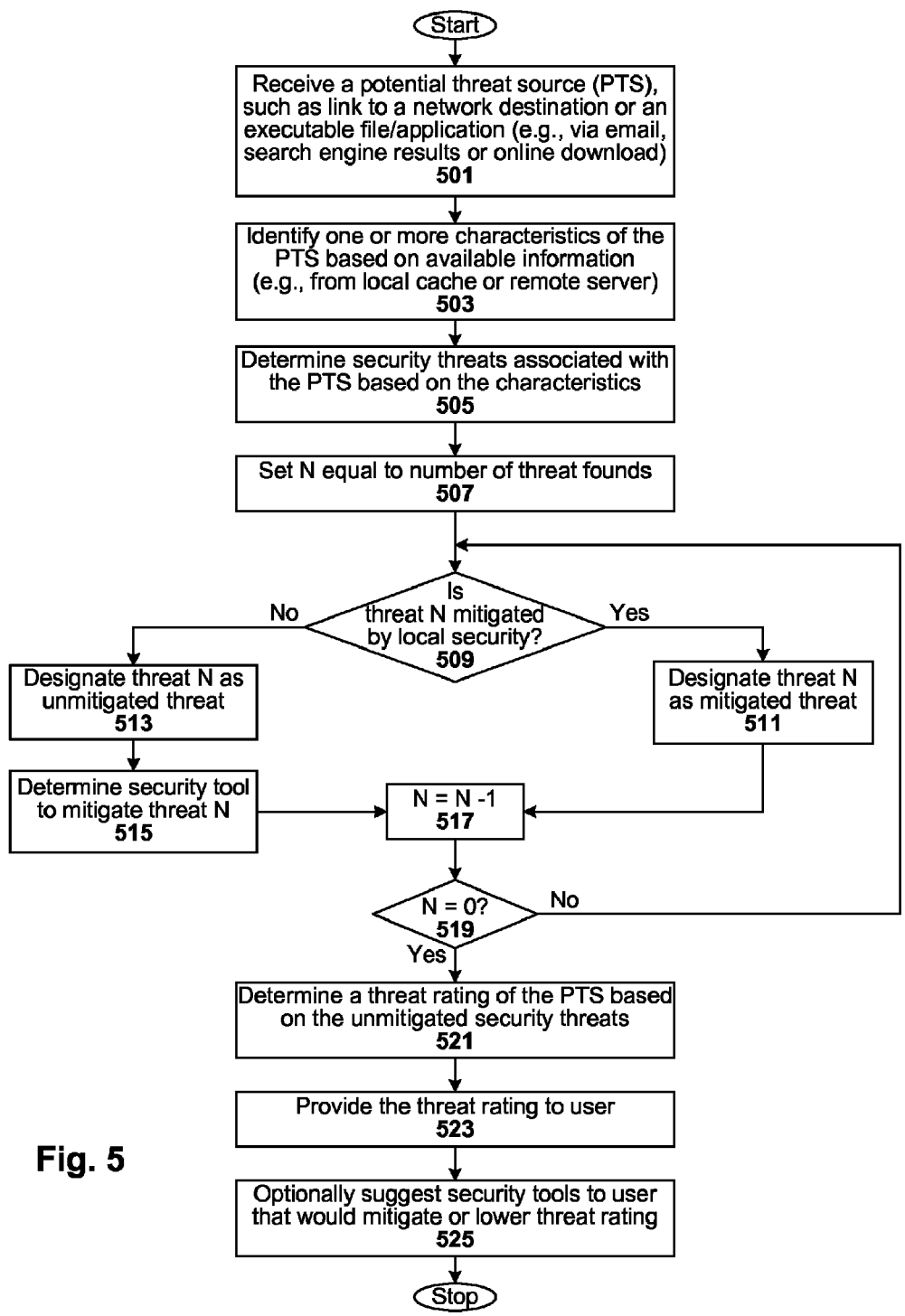
FIG. 5 illustrates a method for threat reporting in light of local security tools, in accordance with one embodiment of the present invention.

FIG. 5 illustrates a method for threat reporting in light of local security tools, in accordance with one embodiment of the present invention. The method can be carried out, for example, by the system shown in FIG. 1, or by the client security module 116 shown in FIG. 3. As previously explained, modules for carrying out the method functionality can be implemented as executable code encoded on one or more machine-readable mediums, in accordance with one particular embodiment.

The method includes receiving 501 a potential threat source (PTS), such as a link to a network destination or an executable file/application (e.g., via email, search engine results or online download). The method continues with identifying 503 one or more characteristics of the PTS based on available information. As previously explained, this can be carried out by the client (e.g., where local cache module or other storage includes characteristics associated with the PTS), or by one or more remote servers (e.g., where various service modules are employed to gather PTS characteristics).

In any case, the method continues with determining 505 security threats associated with the PTS based on the characteristics (if any). This can be achieved, for example, using a look-up table or other database mechanism that associates PTS names or IDs with known security threats. Alternatively, or in addition to, the security threats can be one or more of the characteristics themselves (e.g., a link sourced by a dial-up or cable modem can be viewed as a security threat). The method continues with setting 507 a counter N equal to the number of threats found, which effectively assigns a unique number from 1 to N to each of the security threats.

Then, the method proceeds with determining 509 whether threat N is mitigated by local security. If so, then the method continues with designating 511 threat N as a mitigated threat. If, on the other hand, threat N is not mitigated by local security, then the method continues with designating 513 threat N as an unmitigated threat, and determining 515 one or more security tools that would mitigate threat N, if locally available. The security tool required to mitigate threat N could be, for example, antivirus software or a particular security setting on a browser (e.g., disable scripts) or other user application.

The method continues with decrementing 517 N by one, and determining 519 if N is equal to 0. If not, then there are still other threats to analyze. Accordingly, steps 509, 511, 517 and 519 or steps 509, 513, 515, 517 and 519 are repeated, depending on whether the next threat N is mitigated by local security. This analysis is repeated until N is equal to 0, meaning that there are no more threats to process. Then the method continues with determining 521 a threat rating of the PTS based on the unmitigated security threats, as previously discussed with reference to the threat rating module 314.

The method continues with providing 523 the threat rating to the user, and optionally suggesting 525 security tools to user that would mitigate or lower threat rating. As previously explained, the threat rating can be communicated to the user using any number of mechanisms that effectively communicate the significance of a threat, including icons, threat rating scales, and audible messages or warning tones (e.g., that increase in pitch and/or frequency with greater threats). FIGS. 6*a*-6*d* show a number of example forms of how a threat rating and recommendations can be communicated to a user, in accordance with various embodiments of the present invention.

Figure 6A:
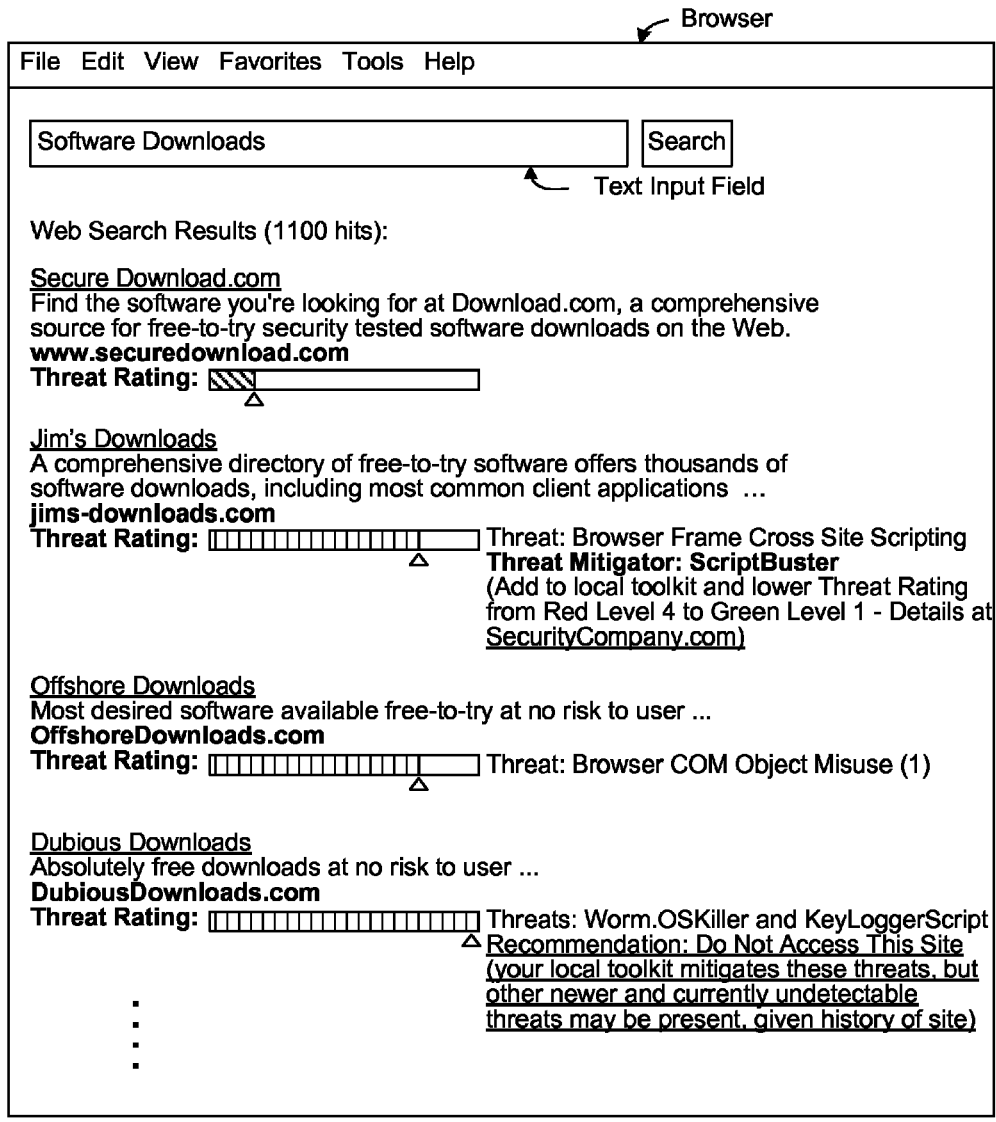
FIGS. 6a-6d show a number of example forms of how a threat rating and recommendations can be communicated to a user, in accordance with various embodiments of the present invention.

FIG. 6*a* shows a number of links returned by a search engine (via a browser) in response to a user's web search for "Software Downloads." The first link included in the search results (Secure Download.com) has a relatively low threat rating (about a 1 out of 5). This threat rating could be low because local security tools readily mitigate any known threats associated with that site. Alternatively, the threat rating could be low simply because the only risk associated with site is that the user has not visited that particular site before, for example. Thus, the threat rating graphic shows a green bar that is only about 20% of the way to the high threat red zone. The next link to "Jim's Downloads" is given a high threat rating of about 4 out of 5, due to a detected threat (Browser Frame Cross Site Scripting). However, a suggestion to add a security tool (ScriptBuster) to the local tool kit is also presented to the user, so that user knows he can reduce the threat rating from red level 4 to a green level 1. A link to a security company offering the ScriptBuster tool is also provided, to facilitate the user's procurement of that tool, if so desired. The next link to "Dubious Downloads" is given the highest threat rating of about 5, due to detected malware (Worm.OSKiller and KeyLoggerScript). Here, a recommendation to not access the site is provided to the user, despite the mitigating tools locally available to the user, because of significant negative history of the site. In one such embodiment, the user may be given the option to click through the link, despite such recommendations, and known threats would be mitigated as normal.

Figure 6B:
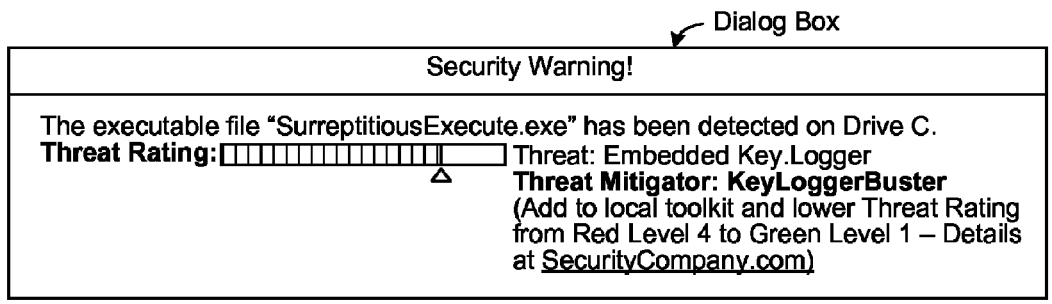
Figure 6C:
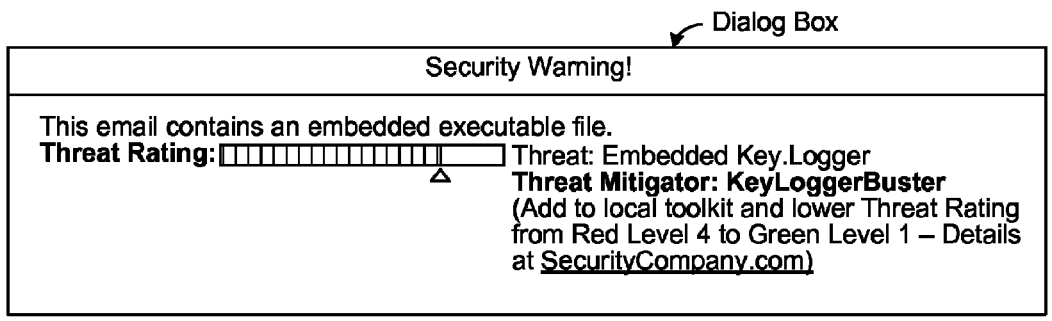
Figure 6D:
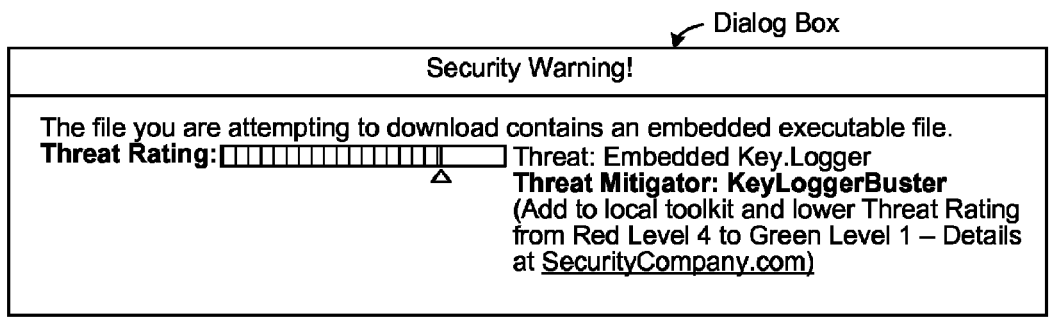

FIG. 6b shows a "Security Warning" dialog box that has been presented to the user after an executable (SurreptitiousExecute.exe) has been detected (e.g., during a routine system scan), which is associated with a known threat (Embedded Key.Logger). This executable is thus given a high threat rating of about 4 out of 5. However, a suggestion to add a security tool (KeyLoggerBuster) to the local tool kit is also presented to the user, so that user knows she can reduce the threat rating from red level 4 to a green level 1. A link to a security company offering the KeyLoggerBuster tool is also provided in the dialog box, to facilitate the user's acquisition of that tool, if so desired. FIG. 6c shows a similar security warning dialog box that has been presented to the user after an email containing an embedded executable file has been detected (Embedded Key.Logger). User is given similar information as discussed with reference to FIG. 6b. FIG. 6d shows a similar security warning dialog box that has been presented to the user after the user attempts to download an executable that is associated with a known threat (Embedded Key.Logger). User is given similar information as discussed with reference to FIGS. 6b and 6c. Numerous other such graphical user interface techniques can be employed, as will be apparent in light of this disclosure.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A computer implemented method for threat reporting in light of local security tools, comprising:
using a computer to perform steps comprising:
identifying a network link identifying a web site that is a potential threat source (PTS) for the computer;
determining a plurality of security threats associated with the PTS, wherein the plurality of security threats are associated with characteristics of the web site identified by the network link;
determining an initial threat rating for the PTS based on the plurality of security threats associated with the PTS;
identifying mitigated security threats of the plurality of security threats that are mitigated by local security on the computer and unmitigated security threats of the plurality of security threats that are not mitigated by local security on the computer;
adjusting the initial threat rating for the PTS to account for the mitigated security threats and the unmitigated security threats to produce an adjusted threat rating based on the unmitigated security threats; and
providing the adjusted threat rating to a user of the computer.

2. The method of claim 1 further comprising:
identifying one or more characteristics of the web site, the characteristics selected from the set consisting of: a frequency with which the computer has visited the web site, whether a previous visit to the web site had a negative impact on the computer, a type of negative impact on the computer resulting from a previous visit to the web site, and a source of the network link identifying the web site; and
determining threat weights associated with unmitigated ones of the identified characteristics;
wherein the adjusted threat rating of the PTS is determined based at least in part on the threat weights of the unmitigated characteristics of the web site.

3. The method of claim 2, further comprising:
normalizing a sum of the threat weights associated with the unmitigated characteristics of the web site to produce the threat adjusted rating.

4. The method of claim 1 further comprising:
automatically determining one or more security tools that would mitigate one or more of the unmitigated security threats.

5. The method of claim 4 further comprising:
automatically suggesting procurement of the one or more security tools to the user to improve the adjusted threat rating.

6. The method of claim 1 further comprising:
automatically suggesting procurement of security tools to the user that would lower the adjusted threat rating.

7. The method of claim 1 wherein providing the adjusted threat rating to the user includes providing a graphical indicator.

8. The method of claim 1, further comprising:
determining whether one or more of the plurality of security threats associated with characteristics of the web site identified by the network link are mitigated by security settings of a web browser used by the user to access web sites from the computer, wherein a security threat associated with a characteristic of the web site is designated a mitigated threat if it is mitigated by the security settings of the web browser.

9. The method of claim 1, wherein the network link is presented to the user on a web page, and wherein the adjusted threat rating is provided to the user of the computer in association with the presentation of the network link on the web page.

10. The method of claim 9, wherein the adjusted threat rating is provided to the user as a pop-up message.

11. A non-transitory computer-readable storage medium encoded with instructions, that when executed by one or more processors, cause the processors to carry out a process for threat reporting in light of local security tools, the process comprising:
identifying a network link identifying a web site that is a potential threat source (PTS) for a computer;
determining a plurality of security threats associated with the PTS, wherein the plurality of security threats are associated with characteristics of the web site identified by the network link;
determining an initial threat rating for the PTS based on the plurality of security threats associated with the PTS;
identifying mitigated security threats of the plurality of security threats that are mitigated by local security on the computer and unmitigated security threats of the plurality of security threats that are not mitigated by local security on the computer;

adjusting the initial threat rating for the PTS to account for the mitigated security threats and the unmitigated security threats to produce an adjusted threat rating based on the unmitigated security threats; and providing the adjusted threat rating to a user of the computer.

12. The computer-readable storage medium of claim 11, the process further comprising:

identifying one or more characteristics of the web site, the characteristics selected from the set consisting of: a frequency with which the computer has visited the web site, whether a previous visit to the web site had a negative impact on the computer, a type of negative impact on the computer resulting from a previous visit to the web site, and a source of the network link identifying the web site; and determining threat weights associated with unmitigated ones of the identified characteristics;

wherein the adjusted threat rating of the PTS is determined based at least in part on the threat weights of the unmitigated characteristics of the web site.

13. The computer-readable storage medium of claim 11, the process further comprising:

automatically determining one or more security tools that would mitigate one or more of the unmitigated security threats.

14. The computer-readable storage medium of claim 13, the process further comprising:

automatically suggesting procurement of the one or more security tools to the user to improve the adjusted threat rating.

15. The computer-readable storage medium of claim 11, the process further comprising:

automatically suggesting procurement of security tools to the user that would lower the adjusted threat rating.

16. A system for threat reporting in light of local security tools, comprising:

a non-transitory computer-readable storage medium encoded with executable instructions for:

identifying a network link identifying a web site that is a potential threat source (PTS) for a computer;

determining a plurality of security threats associated with the PTS, wherein the plurality of security threats are associated with characteristics of the web site identified by the network link;

determining an initial threat rating for the PTS based on the plurality of security threats associated with the PTS;

identifying mitigated security threats of the plurality of security threats that are mitigated by local security on the computer;

identifying unmitigated security threats of the plurality of security threats that are not mitigated by local security on the computer;

adjusting the initial threat rating for the PTS to account for the mitigated security threats and the unmitigated security threats to produce an adjusted threat rating based on the unmitigated security threats; and providing the adjusted threat rating to a user of the computer; and a processor for executing the instructions.

17. The system of claim 16 further comprising instructions for:

identifying one or more characteristics of the web site, the characteristics selected from the set consisting of: a frequency with which the computer has visited the web site, whether a previous visit to the web site had a negative impact on the computer, a type of negative impact on the computer resulting from a previous visit to the web site, and a source of the network link identifying the web site; and determining threat weights associated with unmitigated ones of the identified characteristics;

wherein the adjusted threat rating of the PTS is determined based at least in part on the threat weights of the unmitigated characteristics of the web site.

18. The system of claim 16 further comprising instructions for:

automatically determining one or more security tools that would mitigate one or more of the unmitigated security threats.

19. The system of claim 18 further comprising instructions for:

automatically suggesting procurement of the one or more security tools to the user to improve the adjusted threat rating.

20. The system of claim 16 further comprising instructions for:

automatically suggesting procurement of security tools to the user that would lower the adjusted threat rating.

* * * * *